May 12, 1964
R. H. McDONALD
3,132,400
FASTENER CLIP
Filed June 5, 1961
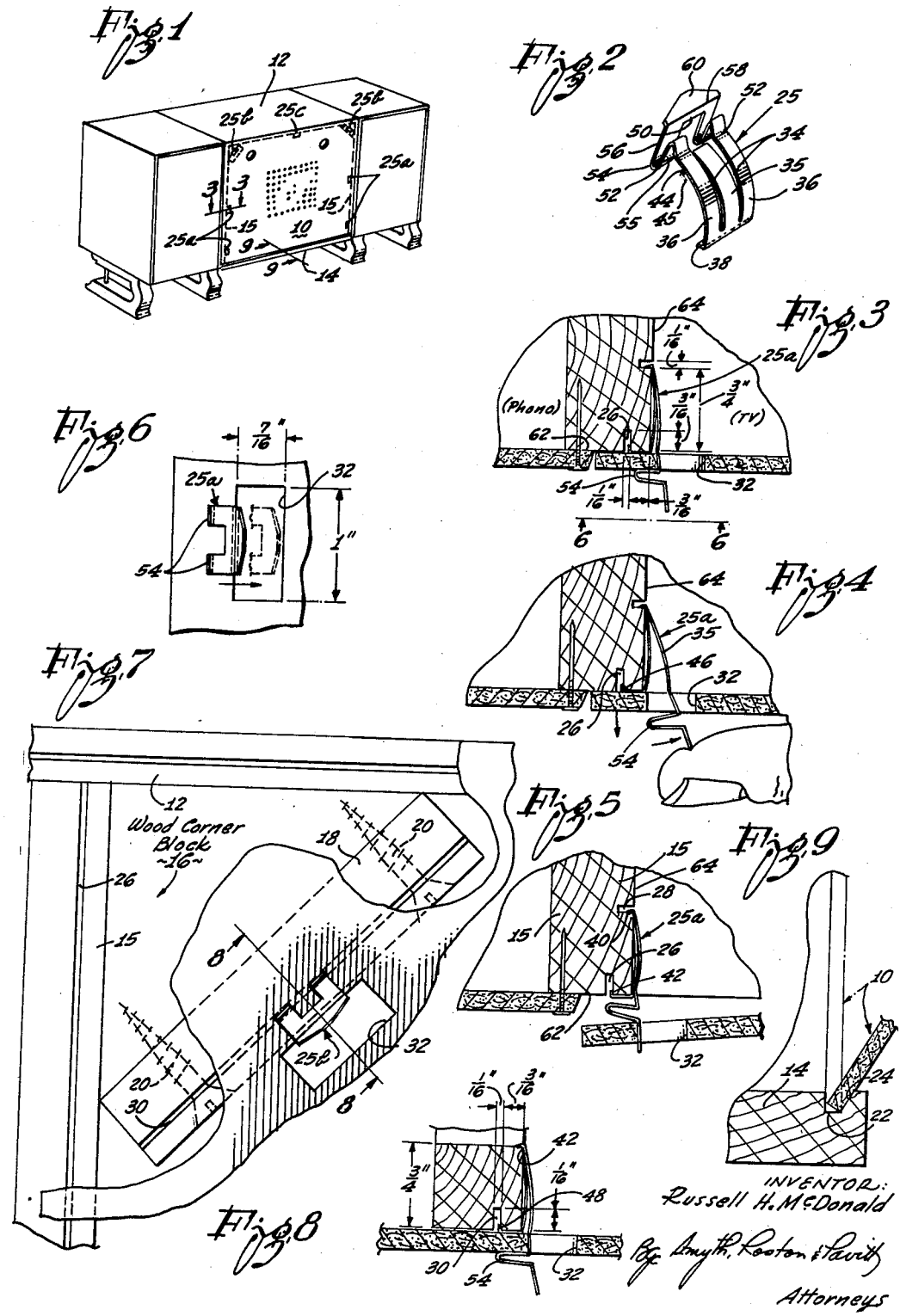
INVENTOR:
Russell H. McDonald
By Smyth, Roston & Pavitt
Attorneys

United States Patent Office 3,132,400
Patented May 12, 1964

3,132,400
FASTENER CLIP
Russell H. McDonald, Canoga Park, Calif., assignor to Packard-Bell Electronics Corporation, Los Angeles, Calif., a corporation of California
Filed June 5, 1961, Ser. No. 114,743
5 Claims. (Cl. 24—259)

This invention relates to a fastener for interconnecting structural parts, and more particularly, relates to yieldable connector clip for releasably interconnecting various members.

While the invention is widely applicable in various fields, it has special utility for releasably securing a back panel of a television cabinet. This particular practice of the invention has been selected for the present disclosure and will provide adequate guidance for those skilled in the art who may have occasion to apply the same principles to other specific purposes.

The removable back panel of a cabinet of a television set is secured in place when all of the components have been installed inside the cabinet and when the television set has been checked for operation. Subsequently, during the service life of the set, the back panel is temporarily removed whenever access to the interior of the cabinet is required for repairs and replacement.

Any fastener that is used to hold the back panel in place must, of course, meet the basic requirement of effectively retaining the panel to prevent anyone, and especially a child, from inadvertently and hazardously touching a highly energized component inside the cabinet. In addition to this basic requirement, two considerations are involved in the design of any fastener means that may be used to secure the back panel.

One consideration is the assembly cost. The more time that is required to secure the back panel, the more skill that is required, and the more expensive the fastening means per se, the higher the cost of initial assembly.

The second consideration is the cost of temporarily removing the back panel after the television set is placed in use. Usually the person who removes and later restores the back panel is a skilled service man charging a high hourly rate. The time required adds to the cost of a service call and any necessity for using new fastening means further increases the cost. Too often, the restored panel is left insecurely mounted after each temporary removal and especially when it is an easy matter to lose or misplace the fastening elements.

Various types of quick-disconnect fasteners may be used but such fasteners are usually somewhat expensive and are usually time-consuming to install. Often quick-disconnect fasteners have the further disadvantage of requiring special tools. In some instances, moreover, the quick-disconnect fasteners or essential parts of the fasteners are too easily lost or misplaced.

The present invention meets all the needs of this situation by providing a fastener in the form of a spring clip. With the fastener clip made in one piece and the one piece adapted to be permanently mounted on the cabinet structure, the invention eliminates the likelihood of the fastener or any part of the fastener being lost or misplaced. Since the one-piece fastener clip can be mass produced, the fastener cost is exceedingly low. Installation of the fastener clip is a simple hand operation requiring no skill and requiring no special tool. Such fastener clips employed to secure a back panel of a television set are manually releasable in a manner of great convenience to a service man.

One of the important advantages of the invention is that the fastener clip acts in stress to hold the panel tightly in place and does not lose its resiliency regardless of the number of times it is temporarily released. In addition, the fastener clip may be salvaged for re-use as efficiently as a new spring clip.

The fastener clip of the invention comprises a single piece of spring sheet metal of bent configuration slotted to form a middle finger flanked by two outside fingers. One end of the clip and the free end of the middle finger cooperate for resiliently gripping a portion of the cabinet in a permanent manner. At the other end of the clip the two outside fingers engage an edge of the panel and are interconnected by a finger piece to facilitate manual release when desired.

The features and advantages of the invention may be understood from the following detailed description and the accompanying drawing.

In the drawing, which is to be regarded as merely illustrative:

FIG. 1 is a rear perspective view of a television cabinet embodying the presently preferred practice of the invention;

FIG. 2 is a perspective view of the fastener clip;

FIG. 3 is a fragmentary section taken along the line 3—3 of FIG. 1 showing an installed fastener clip engaging a back panel of a television cabinet;

FIG. 4 is a similar view showing how the fastener clip may be manually flexed out of engagement with the back panel;

FIG. 5 is a similar view showing how a fastener clip released in the manner shown in FIG. 4 serves to hold the back panel in outwardly flexed state until all of the fastener clips are disengaged from the panel to permit removal of the panel;

FIG. 6 is a fragmentary elevational view of a portion of the back panel with a fastener clip in engagement therewith;

FIG. 7 is a fragmentary elevation showing a corner of the rear opening of the television cabinet with the fastener clip securing the panel to a gusset member, parts being broken away to reveal concealed structure;

FIG. 8 is a fragmentary section taken along the line 8—8 of FIG. 7 showing how a fastener clip is mounted on a portion of the gusset structure of FIG. 7 in engagement with a back panel to hold the panel in assembled position; and FIG. 9 is a fragmentary sectional view taken along the line 9—9 of FIG. 1 showing how a transverse groove may be provided across the bottom of the back opening of the television cabinet to seat the lower edge of the panel.

FIG. 1 shows a television set combined with a high fidelity radio and a record player. The television set is housed in a cabinet having a central television compartment, the rear opening of which is closed by a removable panel 10. The television compartment of the cabinet has a top wall 12 (FIGS. 1 and 7), a bottom wall 14 (FIGS. 1 and 9), and two opposite side walls 15 (FIGS. 3–5 and 7). The two top corners of the rear opening of the television compartment are reinforced by triangular wooden gusset blocks 16 to which short cleats 18 are secured by screws 20.

Preferably, but not necessarily, the bottom wall 14 projects rearwardly slightly beyond the side walls 15 and is formed with a groove 22 as shown in FIG. 9 to seat the bottom edge of the panel 10. In the preferred practice of the invention, the groove 22 is of the shape and dimensions indicated in FIG. 9, the groove being formed with an inclined rear wall 24. Normally with the panel P closing the back opening of the television compartment, the panel rests vertically in the groove 22 as indicated by the broken lines in FIG. 9. If the panel is not secured in its assembled position, however, the panel can be tilted back against the inclined rear wall 24 of the groove in the manner indicated in solid lines in FIG. 9, the lower edge of the panel seating in the groove 22 in a self-supporting manner.

FIG. 2 shows the presently preferred embodiment of a fastener clip 25 constructed in accord with the teachings of the invention. The fastener clip 25 may be attached at selected points to secure the panel 10. For example, FIG. 1 shows two spaced fastener clips 25a securing the panel 10 to each of the two side walls 15, two fastener clips 25b securing the panel to the two gusset cleats 18 respectively and a fastening clip 25c securing the panel 10 to the top wall 12. It is to be understood that any number of fastener clips may be used.

For cooperation with the fastener clips 25a, each of the two side walls 15 is formed with a vertical groove 26 in its forward edge and a second vertical groove 28 in its inner face in parallel spacing with the forward edge. The top wall 12 is provided with similar grooves (not shown) which extend horizontally for cooperation with the fastener clip 25c. As shown in FIG. 8, each of the cleats 18 is formed with a longitudinal groove 30 on its exposed face in spaced parallel relation to its longitudinal edge for cooperation with the fastener clips 25b.

In preparation for using the selected number of fastener clips 25 to secure the panel 10 in assembled position, the panel is provided with rectangular apertures 32 at the selected locations for the fastener clips. As may be seen in FIGS. 3 and 4, the rectangular apertures 32 to receive the fastener clips 25a are located with one longitudinal edge of each aperture close to the plane of the inner face of the corresponding side wall 15, the aperture extending laterally away from the side wall. The rectangular aperture to receive the fastener clip 25c is similarly located relative to the top wall 12. As may be seen in FIG. 7 the two rectangular apertures 32 to receive the fastener clips 25b are similarly spatially related to the two cleats 18 respectively.

As shown in FIG. 2 the fastener clip 25 is a stamping made of spring sheet metal, preferably spring steel. The stamping is formed with a long U-shaped slot having two parallel longitudinal portions 34. The U-shaped slot forms a central longitudinal finger 35 of the fastener clip flanked by two outside fingers 36 of the fastener clip. The three fingers are united with each other at one end of the fastener clip and this end is formed with a transverse flange 38. The transverse flange 38 is bent to slightly more than 90° to function as a hook.

FIGS. 3, 4 and 5 show how the hook-shaped flange 38 engages a shoulder 40 formed by the groove 28 in a side wall 15 of the television cabinet. The hook-shaped flange 38 of a fastener clip 25c engages a similar shoulder of the top wall 12. FIG. 8 shows how the hook-shaped flange 38 of a fastener clip 25b engages a shoulder 42 at an inner edge of a cleat 18.

The central or middle finger 35 of the fastener clip is formed with a flange 44 and the flange 44 is formed in turn with a flange 45. Thus the two flanges 44 and 45 form a hook. As indicated in FIGS. 3, 4 and 5, when a fastener clip 25a is mounted on a side wall 15 of the television cabinet, the flange 44 lies flat against the front edge surface of the side wall and the flange 45 makes hook engagement with a shoulder 46 formed by the groove 28 in the side wall. In like manner, FIG. 8 shows how a fastener clip 25b mounted on a cleat 18 has its flange 44 lying against the back face of the cleat with its flange 45 in hook engagement with a shoulder 48 formed by the groove 30 in the cleat.

At the second end of the fastener clip 25 the two outer fingers 36 of the fastener clip are integral, the two fingers being interconnected by a web 50. Each of the two outer fingers 36 is bent slightly along the line 52 and is formed with a laterally extending loop 54 having an inner leg 55 and an outer leg 56. The two outer legs 56 are joined by the web 50 and the web 50 is bent to form an outwardly extending tongue 60 that serves as a handle or finger piece for convenient manipulation of the fastener clip.

When a fastener clip 25 is in service, the two outer fingers 36 of the clip extend through the corresponding rectangular aperture 32 in the back panel 10 and the loops 54 of the outside fingers hook over the edge of the aperture with the inner legs 55 of the loops in pressure contact with the outer face of the panel.

In the preferred practice of the invention all three of the fingers 35 and 36 of the fastener clip are bowed as shown in FIG. 2 and at the unrestrained bowed configuration of the fastener clip the hook-shaped flange 38 at the one end of the fastener clip and the flange 54 of the middle finger of the fastener clip are spaced somewhat closer together than the distance from the shoulder 40 of a side wall 15 to the front edge surface 62 of the side wall. Thus the installation of a fastener clip into permanent gripping engagement with a side wall 15 or a top wall 12 of the cabinet increases the distance from the hook-shaped end flange 38 of the clip to the flange 44 of the middle finger 32 of the clip, the clip being resiliently stressed in this manner to exert gripping pressure on the wall of the cabinet. In the same way a clip 25b is resiliently stressed when it is mounted on a cleat 18 in the manner shown in FIG. 8.

Referring to FIG. 3, it is apparent that the function of the fastener clip is to connect a first member in the form of a side wall 15 to a second member in the form of the panel 10 with the panel 10 resting against a first surface 62 of the first member. The clip engages a shoulder formed by a slot 26 in the first surface 62 and also engages a shoulder 40 that is adjacent a second surface 64 of the first member, the second surface 64 being perpendicular to the first surface 62 and the second shoulder 40 being parallel to the first surface 62.

It is a simple matter to install a clip fastener 25. For example, to mount one of the clip fasteners 25a on one of the side walls 15, the flange 45 of the middle finger 35 may be inserted into the groove 26 and then pressure may be exerted against the outer face of the bowed middle finger to flatten the middle finger until the hook-shaped flange of the fastener clip enters the groove 28. When the flattening pressure is released the fastener clip tends resiliently to resume its initial unrestrained bowed configuration and thus acts in stress for effective gripping action on the cabinet wall. In the same manner the fastener clips 25b may be permanently mounted on the two cleats 18 and the fastener clip 25c may be mounted on the top wall 12. No tool is required and no skill is required to mount the fastener clips in this manner.

With the desired number of clips permanently mounted on the cabinet in this manner and with the back panel 10 formed with rectangular apertures 32 corresponding to the clips, the bottom edge of the panel is seated in the bottom groove 22 in the bottom wall 12 of the cabinet and then the panel is swung forward towards its vertical position.

It is a simple matter to maneuver the tongue or finger piece 60 of a fastener clip into a position extending into a rectangular aperture 32 of the panel 10 indicated in FIG. 5. With a fastener clip related to the aperture 32 in the back panel 10, in the illustrative manner, it is a simple matter to flex the two outside fingers 36 of the fastener clip by finger pressure applied to the tongue 60 in the manner shown in FIG. 4. This flexure shifts the two loops 54 of the fastener clip into register with the rectangular aperture 32 to permit the panel 10 to be positioned flat against the edge surface of the corresponding wall or cleat of the cabinet. The tongue 60 may then be released to permit the loops 54 of the two outside fingers 36 to snap into engagement with the back panel as shown in FIG. 3.

A feature of the invention is that in carrying out the above-described procedure of engaging the fastener clips successively with the back panel, the first clip to be engaged holds the panel upright with the panel resiliently distorted to press against the remaining fastening clips. Thus the first fastener clip to be engaged holds the corresponding portion of the panel in assembled position as shown in FIG. 3, but the portions of the panel at the remaining fastener clips is held by outward contact with the outer legs 56 of the loops 54 of the fastener clips in the manner shown in FIG. 5. Since the panel resiliently presses inward against the disengaged fastener clips it is merely necessary to flex the disengaged fastener clips in succession in the manner shown in FIG. 4 to cause the remaining fastener clips to engage and secure the panel. Since each of the loops 54 tends when unrestrained to take the position shown in FIG. 5, it is apparent that an engaged fastener clip is stressed by the panel so that the fastener clip resiliently exerts pressure to hold the panel tight at its assembled position.

The reverse procedure of removing the panel starts with flexing one of the fastener clips to its open position as shown in FIG. 4. Then the local portion of the panel is manually flexed outward and the fastener clip is released to engage the inner side of the panel as shown in FIG. 5. At this point with one fastener clip flexing a local portion of the panel outward, the panel resiliently presses outward against the remaining engaged fastener clips. When one of the remaining engaged fastener clips is flexed as indicated in FIG. 4 for disengagement from the panel, the panel tends to spring outward so that releasing the flexed fastener clip results in the loop 54 of the clip engaging the inner side of the panel in the manner shown in FIG. 5. In some instances it may be necessary to assist manually the outward flexure of the panel. Thus with the panel distorted outward in the manner shown in FIG. 5 by one or more clips, the panel is automatically released from the remaining clips when the remaining clips are successively flexed in the manner shown in FIG. 4. The fully released panel then gravitates rearward to the outwardly inclined position shown in FIG. 9 instead of dropping to the floor. The panel may be left in this position if it provides sufficient access to the interior of the television cabinet. If full access is desired, the panel is simply lifted out of the groove 22.

My description in specific detail of the presently preferred embodiment of the invention will suggest various changes, substitutions and other departures from my disclosure within the spirit and scope of the appended claims.

I claim:

1. In combination, a first member provided with a first groove on a first surface and with a second groove on a second surface transverse to the first surface,
    a second member provided with first and second substantially parallel surfaces and with an aperture between the first and second surfaces, and
    a fastener made from a spring material and disposed relative to the first and second members to hold the first and second members in fixed and contiguous relationship to each other along the first surfaces of the first and second members, the fastener including:
        first and second fingers disposed in spaced relationship along their lengths and extending in the second direction,
        first flange portions on the first and second fingers at a first end of the first and second fingers, the first flange portions being disposed in the second groove of the first member,
        a second flange portion only on the first finger, the second flange portion extending along the first surfaces of the first and second members between the first and second members and extending into the first groove,
        the first and second fingers being provided with a bowed configuration and being provided in the bowed configuration with a length slightly less than the distance between the first and second grooves and being provided in at least a partially unbowed configuration with a length corresponding to the distance between the first and second grooves to provide for a respective disposition of the first and second flange portions in the first and second grooves, and
        a hooked portion extending only from the second finger at the same end of the finger as the second flange portion on the first finger and extending through the aperture in the second member and disposed against the second surface of the second member.

2. The combination set forth in claim 1 wherein the hooked portion constitutes an extension of the second finger and has a length to extend through the aperture in the second member and has a looped portion engaging the second surface of the second member and wherein the hooked portion is pivotable about the first member as a fulcrum to provide for the removal of the second member from the first member.

3. In combination, a first member provided with a first groove on a first surface and with a second groove on a second surface transverse to the first surface,
    a second member provided with first and second substantially parallel surfaces and with an aperture between the first and second surfaces, and
    a fastener made from a spring material and disposed relative to the first and second members to hold the first and second members in fixed and contiguous relationship to each other along the first surfaces of the first and second members, the fastener including:
        first and second fingers, there being a slot between the first and second fingers to define the first and second fingers,
        the fingers being provided with a length at least equal to the distance between the first surface of the first member and the second groove on the second surface of the first member and being bowed to provide in the bowed configuration a length less than the distance between the first surface of the first member and the second groove on the second surface of the first member,
        first flanges on the first and second fingers at a first end of the fingers, the first flanges extending into the second groove on the second surface of the first member,
        a second flange only on the first finger at a second end of the finger opposite to the first end, the second flange extending between the first and second members along the first surfaces of the first and second members,
        a third flange extending from the second flange into the first groove in the first surface of the first member to provide for the respective dispositions of the first and third flanges in the second and first grooves in the first member in the unbowed disposition of the first and second fingers, and
        a hooked portion extending only from the second finger at the second end of the second finger and extending through the aperture in the second member and provided with a looped portion which rests against the second surface of the second member and retains the second member against the first member.

4. The combination set forth in claim 3 wherein the first and second flanges extend in directions substantially parallel to the first surfaces of the first and second members and the third flange extends in a transverse direction relative to the first and second flanges and in a direction toward the first flange.

5. The combination set forth in claim 4 wherein the hooked portion constitutes an extension of the first finger for a distance corresponding substantially to the distance between the first and second surfaces of the second member and wherein the hooked portion is provided with a looped portion at the end of the extension of the hooked portion and wherein the looped portion includes a first portion extending along the second surface of the second member toward the first groove in the first surface of the first member and away from the aperture in the second member and wherein the looped portion includes a second portion extending in substantially the opposite direction to the first portion to provide for a gripping of the looped portion and a movement of the looped portion toward the aperture in the second member for the removal of the second member from the first member.

References Cited in the file of this patent

UNITED STATES PATENTS

| | | |
|---|---|---|
| 1,020,916 | Lanier | Mar. 19, 1912 |
| 2,208,727 | Marshall | July 23, 1940 |
| 2,676,679 | Price | Apr. 27, 1954 |
| 2,868,486 | Poupitch | Jan. 13, 1959 |
| 2,869,201 | Wolff | Jan. 20, 1959 |
| 2,914,148 | Bock | Nov. 24, 1959 |
| 3,019,954 | Faltin | Feb. 6, 1962 |